United States Patent
Kang et al.

(10) Patent No.: US 9,038,520 B2
(45) Date of Patent: May 26, 2015

(54) METHOD OF MANUFACTURING CORRUGATED PREFORM USING BRAIDING PROCESS

(71) Applicants: Hyundai Motor Company, Seoul (KR); Kia Motors Corporation, Seoul (KR)

(72) Inventors: Hyun-Min Kang, Gyeonggi-do (KR); Joon-Seok Lee, Gyeongsangbook-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 0 days.

(21) Appl. No.: 13/911,367

(22) Filed: Jun. 6, 2013

(65) Prior Publication Data
US 2014/0182447 A1    Jul. 3, 2014

(30) Foreign Application Priority Data
Dec. 28, 2012   (KR) .................. 10-2012-0156177

(51) Int. Cl.
*D04C 1/06* (2006.01)
*D04C 1/02* (2006.01)
*F16F 1/00* (2006.01)

(52) U.S. Cl.
CPC .. *D04C 1/06* (2013.01); *D04C 1/02* (2013.01); *F16F 1/00* (2013.01)

(58) Field of Classification Search
CPC ............... D04C 1/02; D04C 1/06; F16F 1/00
USPC ............. 87/11, 34, 41; 138/173; 267/81, 195, 267/259, 292
See application file for complete search history.

(56) References Cited

U.S. PATENT DOCUMENTS

| | | | | | |
|---|---|---|---|---|---|
| 168,845 | A | * | 10/1875 | Pratt | 267/292 |
| 487,149 | A | * | 11/1892 | Krouse et al. | 2/338 |
| 1,224,878 | A | * | 5/1917 | Fisher | 87/1 |
| 3,287,194 | A | * | 11/1966 | Waddell, Jr. | 156/144 |
| 4,962,916 | A | * | 10/1990 | Palinkas | 267/153 |
| 6,907,810 | B2 | * | 6/2005 | Kim | 87/16 |
| 7,908,956 | B2 | * | 3/2011 | Dow et al. | 87/16 |
| 8,048,147 | B2 | * | 11/2011 | Adams | 623/1.35 |
| 8,490,530 | B2 | * | 7/2013 | Kang et al. | 87/23 |
| 8,651,464 | B2 | * | 2/2014 | Lee | 267/140 |
| 2011/0203446 | A1 | * | 8/2011 | Dow et al. | 87/11 |
| 2013/0112070 | A1 | * | 5/2013 | Mach | 87/9 |
| 2013/0125740 | A1 | * | 5/2013 | Kang et al. | 87/23 |
| 2013/0234380 | A1 | * | 9/2013 | Kyoung et al. | 267/292 |
| 2014/0077430 | A1 | * | 3/2014 | Heo et al. | 267/292 |

FOREIGN PATENT DOCUMENTS

JP         2004523256 A    8/2004
KR    10-2009-0050222      5/2009

* cited by examiner

*Primary Examiner* — Shaun R Hurley
(74) *Attorney, Agent, or Firm* — Mintz Levin Cohn Ferris Glovsky and Popeo, P.C.

(57) ABSTRACT

A method of manufacturing a corrugated preform that allows a fiber volume fraction and an orientation angle to be substantially the same at a concave portion and at a convex portion when the corrugated preform is manufactured based on a braiding process. The method includes braiding a composite material corresponding to an outer diameter of a cylindrical cylinder shape, braiding the composite material by connecting a plurality of separate composite materials to one side of the braided composite material, and braiding the composite material to one side of the separate composite material corresponding to the outer diameter of the cylindrical cylinder shape.

5 Claims, 11 Drawing Sheets

1 Step. CLOCKWISE DIRECTION

2 Step.

2' Step. Locking

3 Step. COUNTER CLOCKWISE DIRECTION

4 Step.

3 Step. COUNTER CLOCKWISE DIRECTION

4 Step.

METHOD OF MANUFACTURING CORRUGATED PREFORM USING BRAIDING PROCESS

CROSS-REFERENCE TO RELATED APPLICATIONS

The present application claims priority to Korean Patent Application No. 10-2012-0156177, filed on Dec. 28, 2012, the entire contents of which is incorporated herein for all purposes by this reference.

BACKGROUND OF THE INVENTION

1. Field of the Invention

The present invention relates to a method of manufacturing a corrugated preform and a corrugated preform, and more particularly, to a method of manufacturing a corrugated preform, which allow a concave portion and a convex portion to have substantially the same fiber volume fraction and orientation angle when a preform having a corrugated shape is manufactured based on a braiding process.

2. Description of the Related Art

In general, a vehicle body is supported by a suspension connected to tires, the suspension refers to an apparatus that absorbs vibrations and impact produced when the vehicle travels, adjusts overall balance of the vehicle body based on a state of a road surface, and prevents a tilt of the vehicle in one direction due to a centrifugal force generated when the vehicle turns in response to the centrifugal force.

In addition, a spring is included in the suspension, and specifically, a leaf spring, which is manufactured by laminating steel plates and mainly applied to a commercial vehicle such as a truck or the like, and a coil spring, which is manufactured by winding a steel wire in a coil shape and mainly applied to a passenger vehicle. The spring is typically manufactured by using a metallic material, but research is currently being conducted to substitute the metallic material with a plastic composite material to decrease deterioration caused by chipping resistibility due to corrosion, and decrease the overall weight of the vehicle.

Specifically, since the leaf spring has a simple plate shape, the substituted plastic composite material is applied to the leaf spring. However, when the material of the coil spring is substituted with the plastic composite material while maintaining the coil shape of the coil spring, it may be difficult to maintain a spring constant applied to the suspension of the vehicle due to a difference in absolute rigidity between the metallic material and the plastic composite material.

In addition, in the coil spring, the spring constant may be partially improved by increasing a diameter and a width of the wire and applying a material having greater rigidity while maintaining the coil shape, however, since there may be difficulty in applying the above spring material having high rigidity due to an increase in weight and cost, the above spring may not be applied to a mass production.

However, to substitute the metallic coil spring to which the material having substantially high rigidity is applied, research is being conducted on the spring made of the plastic composite material and having various shapes such as a wrinkle shape, a coil shape, and a wave shape, and particularly, interest is focused on a corrugated spring which is advantageous to implement a spring constant with a closed cross sectional structure.

FIG. 1 is an exemplary view illustrating a hollow corrugated spring of the related art. As illustrated in FIG. 1, the hollow corrugated spring 100 in which a concave portion 10 and a convex portion 20 are alternately laminated has a closed cross sectional structure and may be manufactured by applying a blow molding. However, since the closed cross sectional shape is manufactured by using a composite material having substantially high rigidity to implement the spring constant that can be applied to the suspension of the vehicle, the forming process may be more complex, and mass production may be difficult due to low productivity.

Moreover, since the material that may be applied to the hollow corrugated spring 100 is limited to pure thermoplastic resin or a plastic composite material which contains a reinforcing material of an amount equal to or less than a predetermined amount, and it may be possible to manufacture the entire corrugated spring using a single material, sufficient insulation performance with respect to vibration and noise may not be secured.

In addition, to maintain durability of the hollow corrugated spring 100 and a spring constant sufficient to be applied to the suspension of the vehicle, the hollow corrugated spring 100 must be manufactured based on a fiber reinforced composite material having substantially high rigidity. However, when a process such as a hand lay-up process is applied, costs may increase due to an excessive process time, it may be difficult to implement uniform deformation and physical properties due to a difference of the physical properties caused by a change of a cross sectional area, and therefore a buckling phenomenon, as illustrated in FIG. 2, may occur when the spring is deformed by a load.

SUMMARY

The present invention provides a method of maintaining a substantially similar fiber volume fraction and orientation angle of a concave portion and a convex portion, when the preform having a wrinkle shape is manufactured based on a braiding process, and more particularly, a method of manufacturing a corrugated preform using a braiding process. In addition, the present invention provides a method which may manufacture the concave portion and the convex portion to have substantially the same fiber volume fraction and orientation angle by braiding the concave portion by the same method as a method for a braid having a cylinder shape, and braiding the convex portion in a separation structure by installing, in braiding equipment, a locking apparatus or an apparatus which reversely rotates.

An exemplary embodiment of the present invention provides a method of manufacturing a corrugated preform using a braiding process, including: braiding a composite material corresponding to an outer diameter of a cylindrical cylinder shape; braiding the composite material by connecting a plurality of separate composite materials to one side of the braided composite material, and braiding the composite material to one side of the separate composite material corresponding to an outer diameter of the cylindrical cylinder shape.

In addition, the braiding a composite material corresponding to an outer diameter of a cylindrical cylinder shape and the braiding the composite material by connecting a plurality of separate composite materials to one side of the braided composite material may be applied to a process of manufacturing the concave portion of the corrugated preform. In addition, the braiding a composite material corresponding to an outer diameter of a cylindrical cylinder shape and the braiding the composite material to one side of the separate composite material corresponding to an outer diameter of the cylindrical cylinder shape may braid the composite material while rotating in a predetermined direction.

In addition, the braiding the composite material by connecting a plurality of separate composite materials to one side of the braided composite material may be applied to a step of manufacturing the convex portion of the corrugated preform, and may braid the composite material in a stationary state or braid the composite material while rotating in a direction opposite to the rotating direction of the braiding a composite material corresponding to an outer diameter of a cylindrical cylinder shape and the braiding the composite material to one side of the separate composite material corresponding to an outer diameter of the cylindrical cylinder shape. Moreover, the composite material may be a glass-fiber reinforced composite material having substantially high rigidity or a carbon fiber-reinforced composite material.

According to the exemplary embodiment of the present invention, unlike the existing braiding process, the preform having various shapes such as a cylinder shaped braid structure and a structure which is separated into a plurality of band shapes may be manufactured.

In addition, when a preform is manufactured based on the existing braiding process, when a cross sectional area of the preform is changed, a difference of mechanical physical properties of the composite material may occur as the fiber volume fraction or the orientation angle is changed based on a position of the preform. However, according to the exemplary embodiment of the present invention, the braiding may be achieved by combining the cylinder shape and the structure separated into band shapes, and therefore the preform may have the substantially same fiber volume fraction at any portion thereof despite a change of a cross sectional area and the orientation angles of the braided fibers may be adjusted to allow the circular shape and the band shape to have the substantially same orientation angle. Therefore, according to the method of manufacturing a preform of the present invention, a difference of physical properties due to a change of a cross sectional area may not occur despite the change of a reference shape.

DETAILED DESCRIPTION

Figure 1:
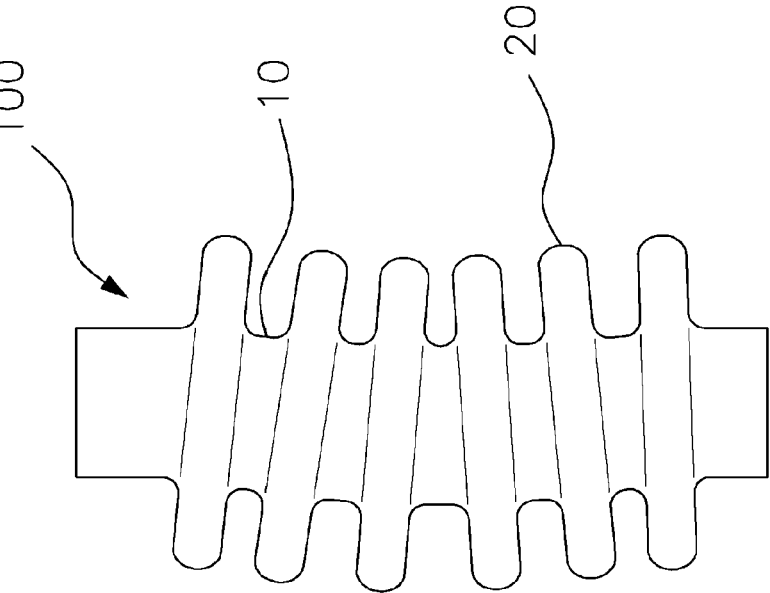
FIG. 1 is an exemplary view illustrating a hollow corrugated spring of the related art.
Figure 2:
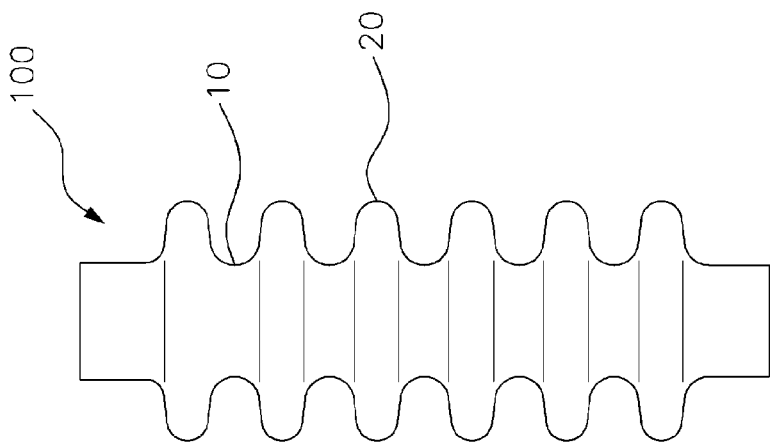
FIG. 2 is an exemplary view illustrating a hollow corrugated spring in which a buckling phenomenon occurs according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It should be understood that terms and words used in the specification and the accompanying claims are not to be construed as having common and dictionary meanings, but should be interpreted as having meanings and concepts corresponding to technical spirit of the present invention in view of the principle that the inventor can properly define the concepts of the terms and words to describe his/her own invention with the best method. Therefore, the embodiments described in the specification and the construction illustrated in the drawings are merely exemplary embodiments of the present invention and do not represent all the technical spirit of the present invention. It is to be understood that various equivalents and modifications can replace them at the time of filing the present application.

Hereinafter, the present invention will be described in more detail with reference to the accompanying drawings.

A method of manufacturing a corrugated preform using a braiding process, according to an exemplary embodiment of the present invention may include braiding a composite material based on an outer diameter of a cylindrical cylinder shape, braiding the composite material by connecting a plurality of separate composite materials to one side of the braided composite material, and braiding the composite material to one side of the separate composite material corresponding to an outer diameter of a cylindrical cylinder shape which may be substantially the same as the cylindrical cylinder shape of the braiding a composite material based on an outer diameter of a cylindrical cylinder shape.

Figure 3:
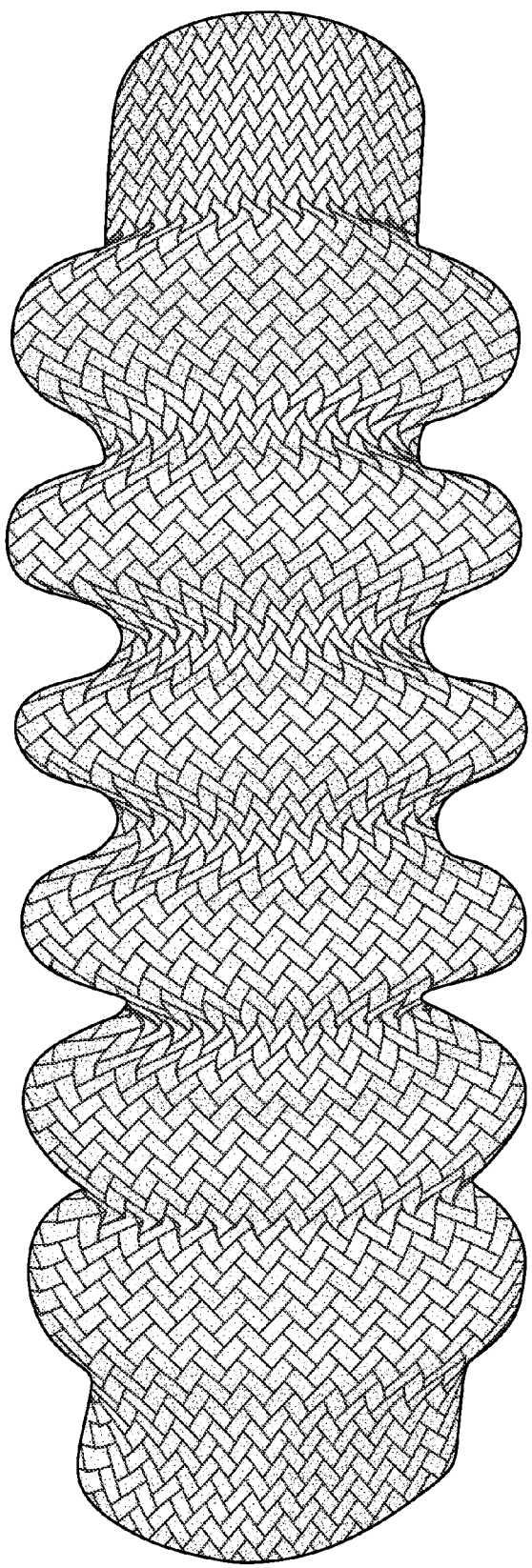
FIG. 3 is an exemplary image of a preform which is braided in a corrugated cylinder shape using carbon fiber by a braiding process of the related art.

FIG. 3 illustrates a corrugated preform in which carbon fiber may be braided on the corrugated mandrel of FIG. 1 using a general braiding method of the related art. In other words, to manufacture the shape of FIG. 3 by a braiding process, first, the fiber may be braided in a cylindrical cylinder shape which has substantially the same size as an edge size of a mandrel, and tension of the fiber, which may be used during the braiding process, may be adjusted using an apparatus or a tool which closely attaches the fiber to a concave or convex curved shape.

Figure 4:
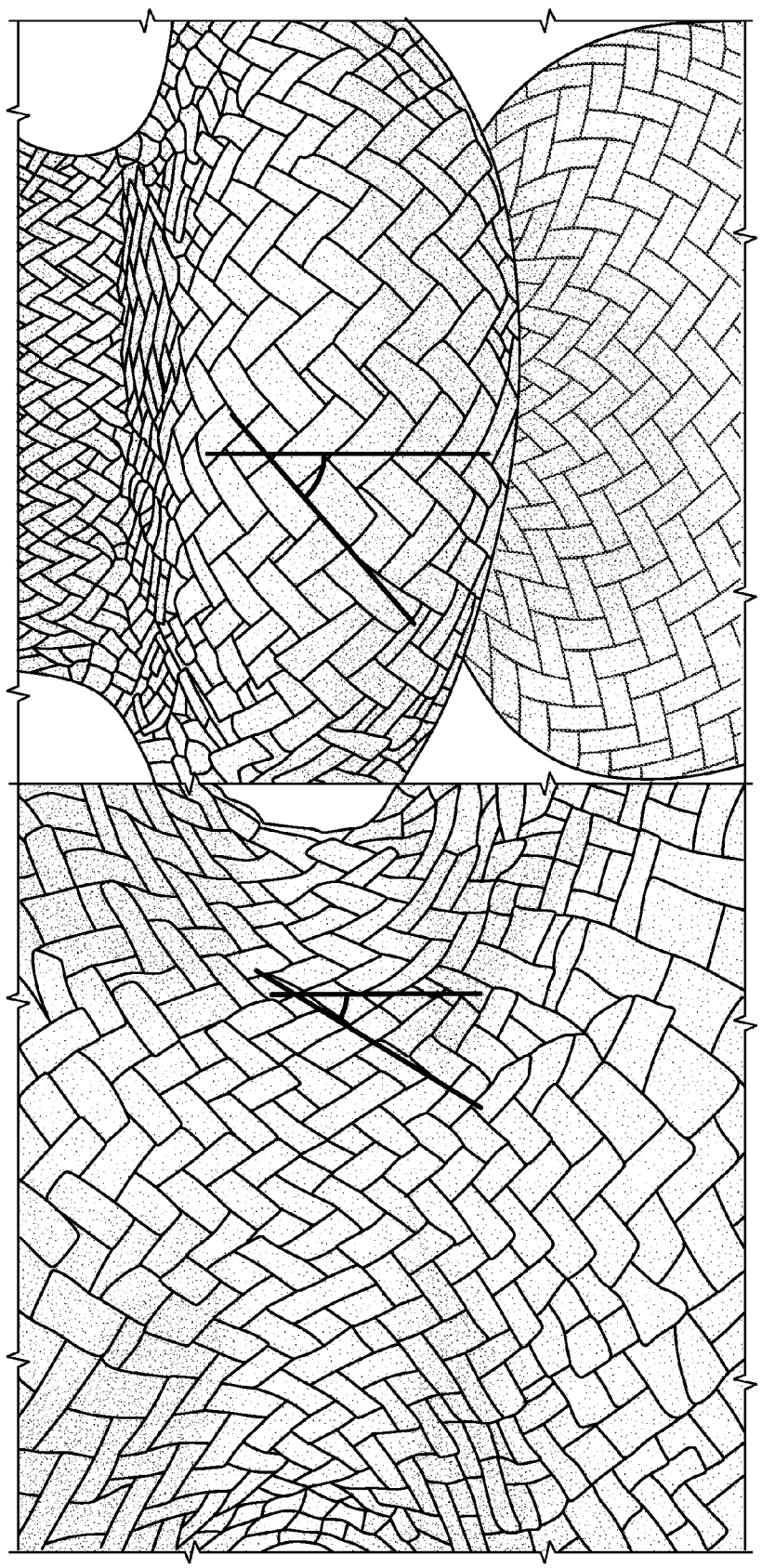
FIG. 4 is an exemplary image illustrating a change of a fiber orientation angle according to a change of a cross sectional area of the preform which is manufactured by the braiding process of the related art.

However, as illustrated in FIG. 4, according to the braiding process of the related art since a portion having a substantially large surface area and a portion having a substantially small surface area are braided identically according to a concave or convex curved shape with the braiding fiber, an orientation angle of the fiber may not be uniform, and therefore, an orientation angle of a concave portion, which has a substantially small surface area, may increase in an axial direction.

Consequently, when the fiber is braided in a wrinkle shape using a general braiding process, the concave portion may have a substantially high fiber volume fraction and the convex portion may have a substantially low fiber volume fraction and the orientation angles may be changed because cross sectional areas of the convex portion and the concave portion may vary. Therefore, when a composite material is manufactured after resin is impregnated, a difference in the physical property may occur due to a change of the cross sectional area.

Figure 5:
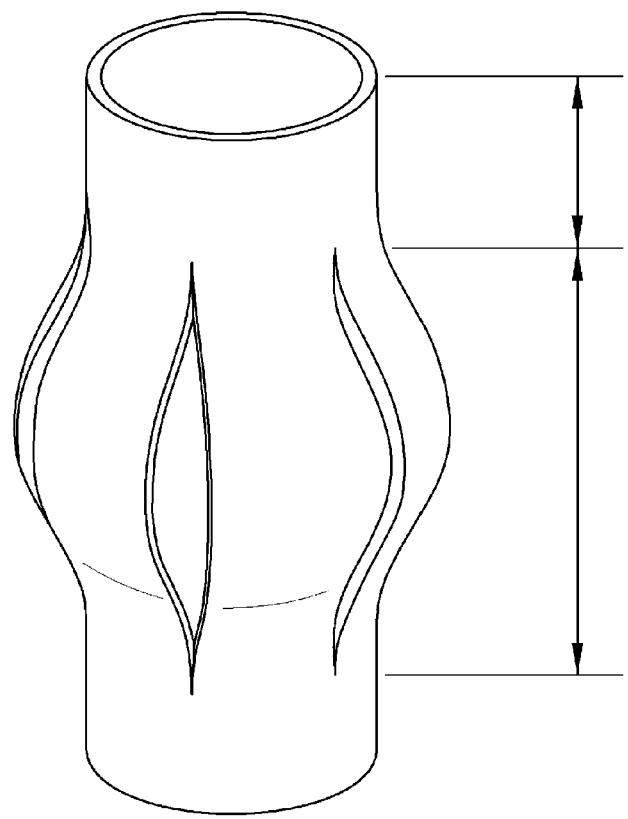
FIG. 5 is an exemplary schematic view of a preform having a cylinder structure and a separation structure having a band shape, according to an exemplary embodiment of the present invention.

Accordingly, as illustrated in FIG. 5, the present invention may provide a method of manufacturing a preform which braids the concave portion in a cylinder shape and forms the convex portion as a separated structure, to thereby form all the portions to have substantially the same fiber volume fraction and orientation angle. In other words, when the corrugated preform is manufactured based on the braiding process, the concave portion may be braided by a similar method to the method for the cylinder shaped braid of the related art, the convex portion may be braided to have the separated structure by installing, in braiding equipment, a locking apparatus or an apparatus which may be configured to rotate in reverse, and therefore, the concave portion and the convex portion may be manufactured to have substantially the same fiber volume fraction and orientation angle.

Figure 6:
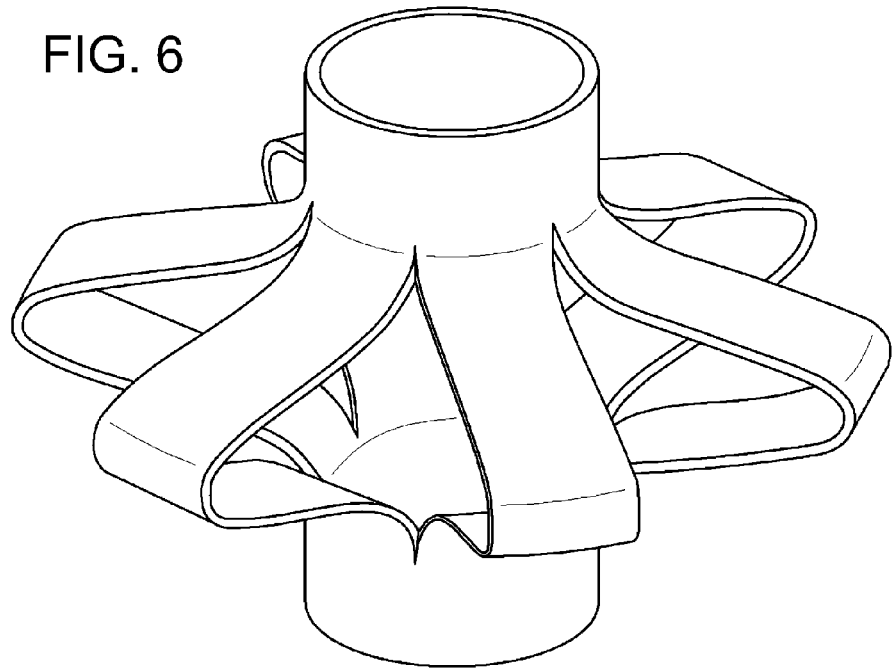
FIG. 6 is an exemplary schematic view illustrating a shape deformed by compression of a preform having a cylinder structure and a separation structure having a band shape, according to an exemplary embodiment of the present invention.

According to the present invention, as illustrated in FIG. 6, the concave portion may have a cylindrical braid structure which may have substantially the same woven shape, and the convex portion may have a braid structure including a plurality of separation structures. In manufacturing the convex portion, the concave portion and the convex portion may have substantially the same fiber volume fraction and orientation angle by using the locking apparatus or the apparatus which reversely rotates and is installed at the braiding equipment.

Hereinafter, a manufacturing process according to the present invention will be described in more detail. In the process of manufacturing the existing two-dimensional or three-dimensional circular braid structure, a first half of the braid fiber may be braided by rotating a plate in a clockwise direction, and a second half of the braid fiber may be braided by rotating the plate in a counter clockwise direction. After the braiding process is performed, a cylindrical cylinder shape of two-dimensional or three-dimensional braid preform of which outer diameters are substantially the same may be produced.

However, when the structure as illustrated in FIGS. 5 and 6 is manufactured by the braiding method of the related art, there are inevitably differences between the fiber volume fraction and the orientation angle of the concave portion and the convex portion. Accordingly, it may be difficult to implement uniform deformation and physical properties due to the varying physical property values, and therefore a buckling phenomenon may occur when the spring is deformed by a load.

Therefore, in the present invention, at the concave portion (e.g., cylindrical cylinder shape) as illustrated at an upper portion of FIG. 5, the composite material may be braided corresponding to an outer diameter of a predetermined cylindrical cylinder shape, similarly to the braiding method of the related art, and thereafter at the convex portion as illustrated at a center portion of FIG. 5, the composite material may be braided using the locking apparatus or the reversely rotating apparatus for the braiding apparatus of the related art. In other words, the braiding a composite material based on an outer diameter of a cylindrical cylinder shape and the braiding the composite material to one side of the separate composite material corresponding to an outer diameter of a cylindrical cylinder shape may be applied to a step of manufacturing the concave portion of the corrugated preform, and the composite material may be braided in the process while rotating in a predetermined direction.

In addition, the braiding the composite material by connecting a plurality of separate composite materials to one side of the braided composite material may be applied to a step of manufacturing the convex portion of the corrugated preform, and the composite material may be braided in a stationary state or while rotating in a direction opposite to the rotating direction of the previous braiding steps.

After the braiding of the convex portion as illustrated at the center portion of FIG. 5 is completed, the composite material may be braided again based on the outer diameter of the cylindrical cylinder shape which may be substantially the same as that of the braiding a composite material based on an outer diameter of a cylindrical cylinder shape.

When the locking apparatus and the reversely rotating apparatus is used in the braiding the composite material by connecting a plurality of separate composite materials to one side of the braided composite material, the braid fiber, which may be rotated in the clockwise direction may be rotated in the counter clockwise direction, or the braid fiber which is rotated in the counter clockwise direction may be rotated in the clockwise direction. Accordingly, the braid preform, which may be separated in band shapes, not a braid preform having a predetermined shape, may be formed.

Figure 7:
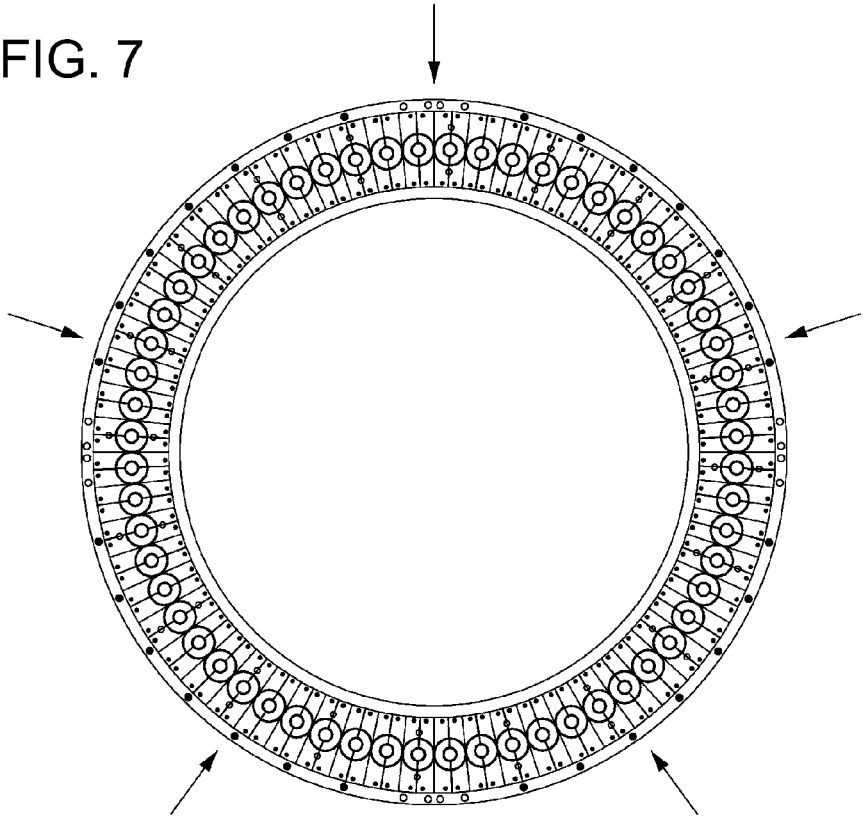
FIG. 7 is an exemplary view of an equipment plate, which is used in a two-dimensional braiding and an exemplary schematic of a locking apparatus according to an exemplary embodiment of the present invention.
Figure 8:
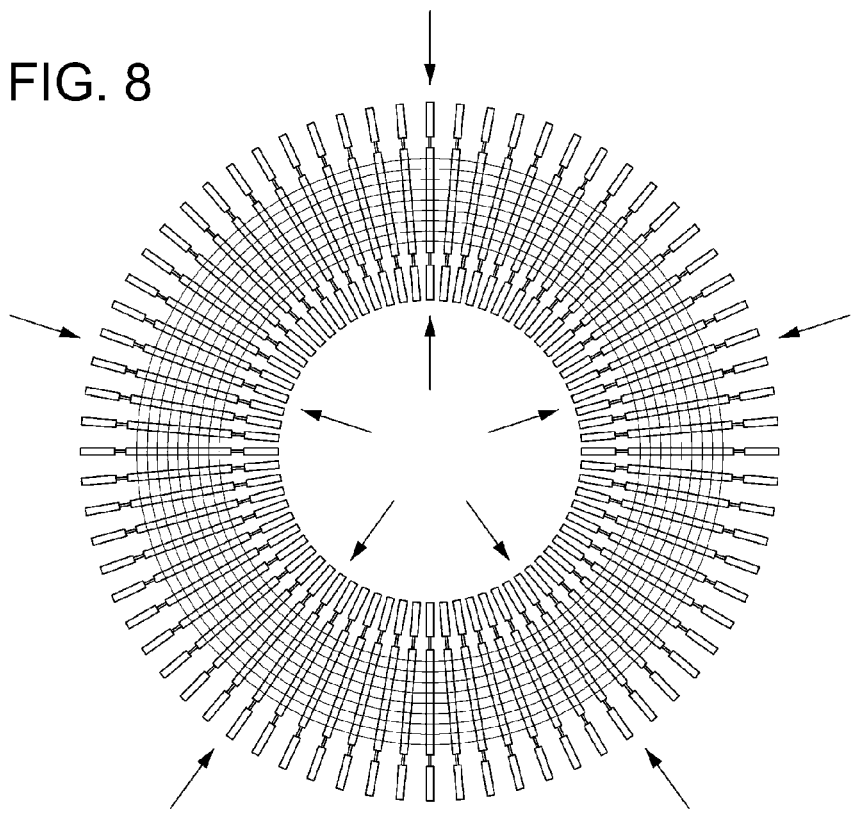
FIG. 8 is an exemplary view of an equipment plate used in a three-dimensional braiding process and an exemplary schematic view of a locking apparatus according to an exemplary embodiment of the present invention.

FIG. 7 and FIG. 8 are exemplary schematic views of an apparatus which may be used in the two-dimensional or three-dimensional braiding process of the present invention. When the locking apparatus or the reversely rotating apparatus is used at the portions indicated by the arrows of FIGS. 7 and 8, the braid preform may be separated at the portions indicated by the arrows, and therefore a structure, which may be separated into five pieces, may be manufactured at the convex portion of the preform.

In the two-dimensional braiding process, the separation structure having band shapes may be manufactured by moving a carrier to a direction opposite to a rotational direction. Similarly, in the three-dimensional braiding process, the separated preform having a band shape may be obtained by rotating the carrier, which rotates in the clockwise direction, in the counter clockwise direction, or rotating the carrier, which rotates in the counter clockwise direction, in the clockwise direction, using the locking apparatus or a locking accessory.

Figure 9:
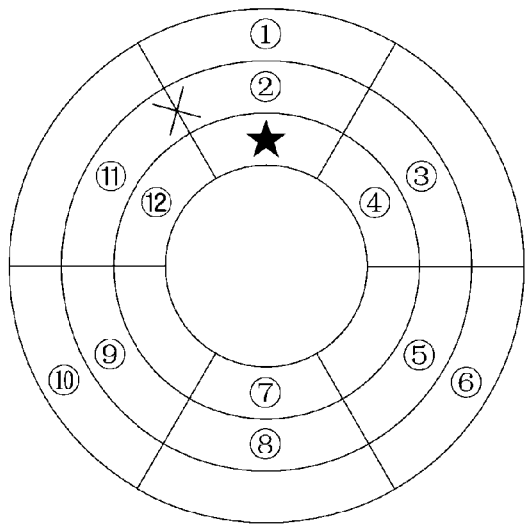
FIG. 9 is an exemplary schematic view illustrating a waiting state for performing a three-dimensional braiding process according to an exemplary embodiment of the present invention.
Figure 10A:
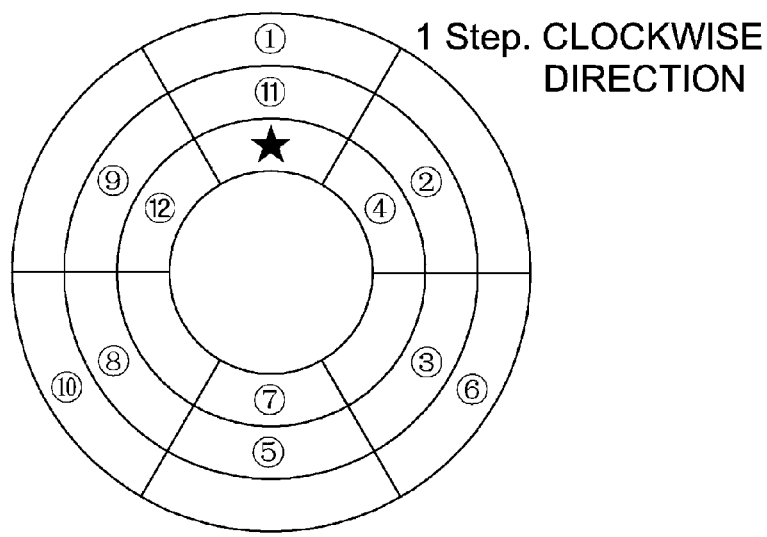
FIGS. 10A to 10J are exemplary schematic views illustrating a braid carrier which is used when a three-dimensional braiding process is performed according to an exemplary embodiment of the present invention.
Figure 10B:
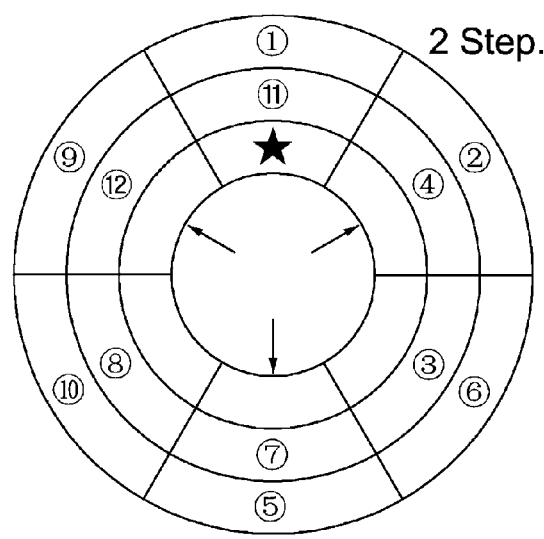
Figure 10C:
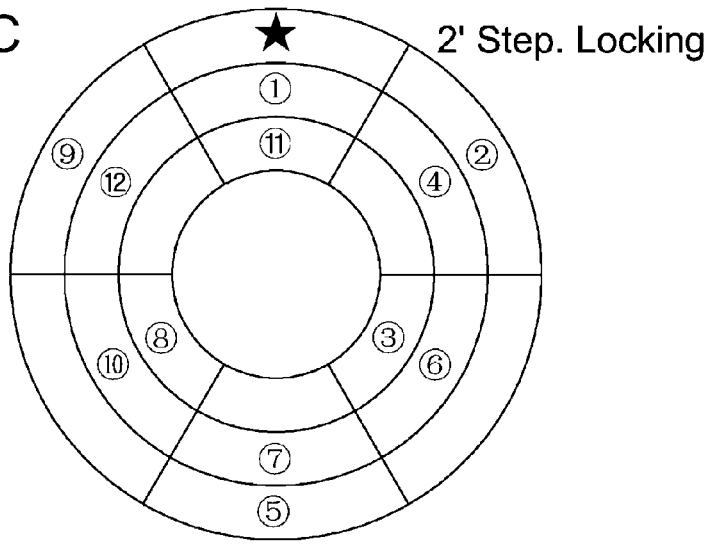
Figure 10D:
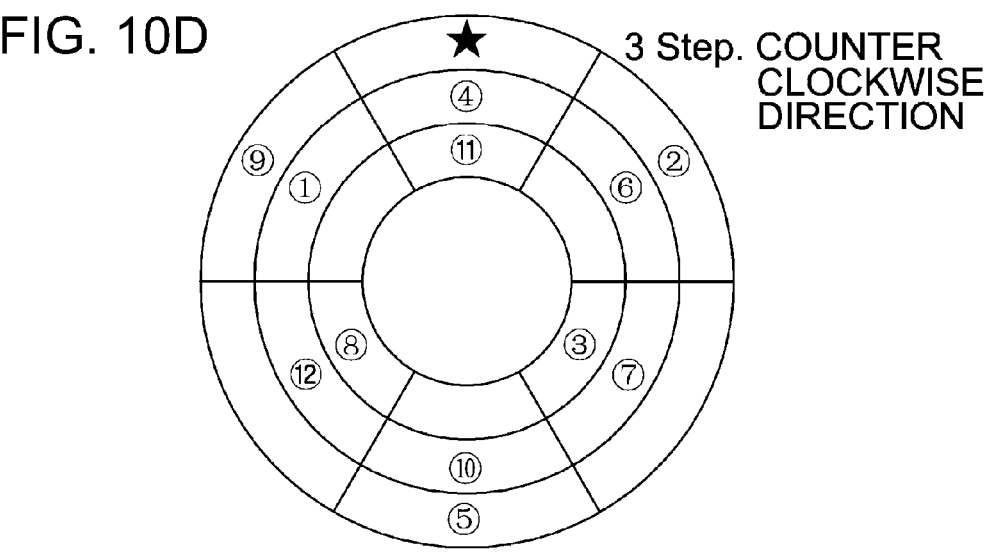
Figure 10E:
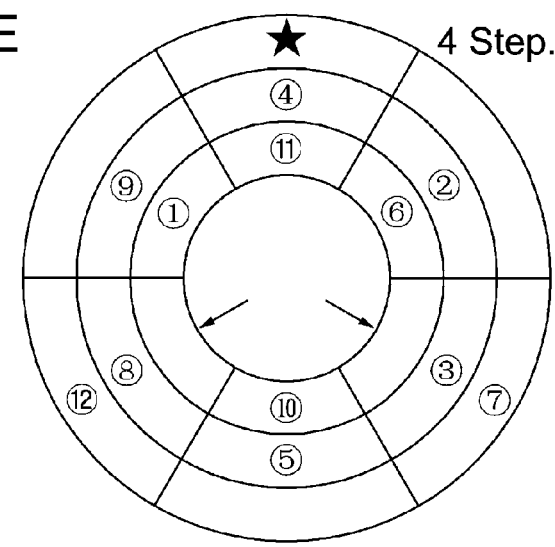
Figure 10F:
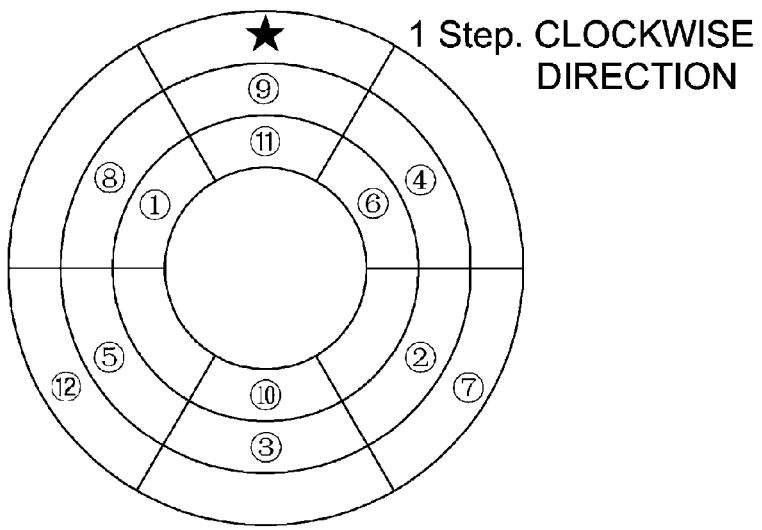
Figure 10G:
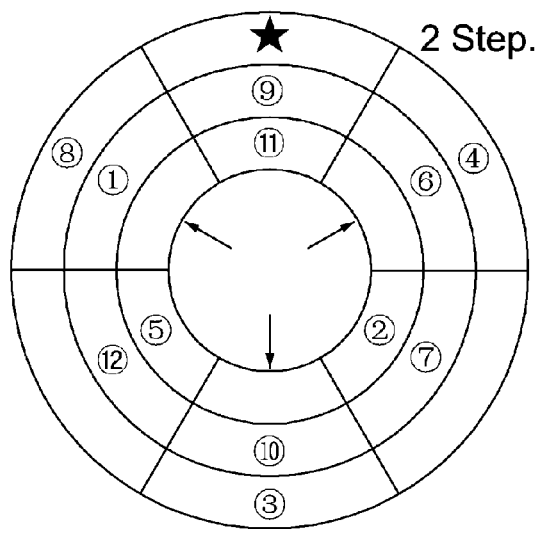
Figure 10H:
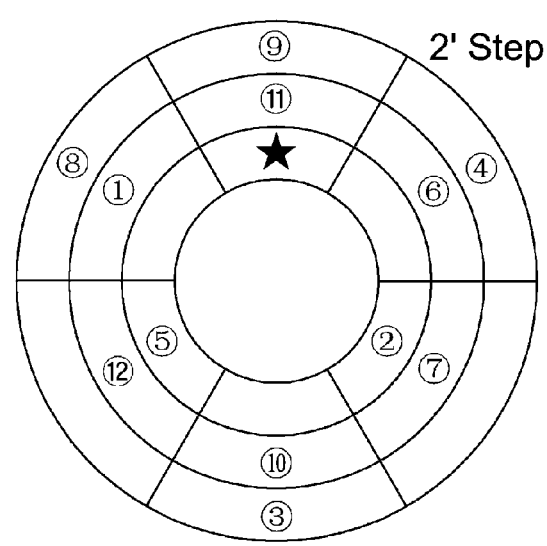
Figure 10I:
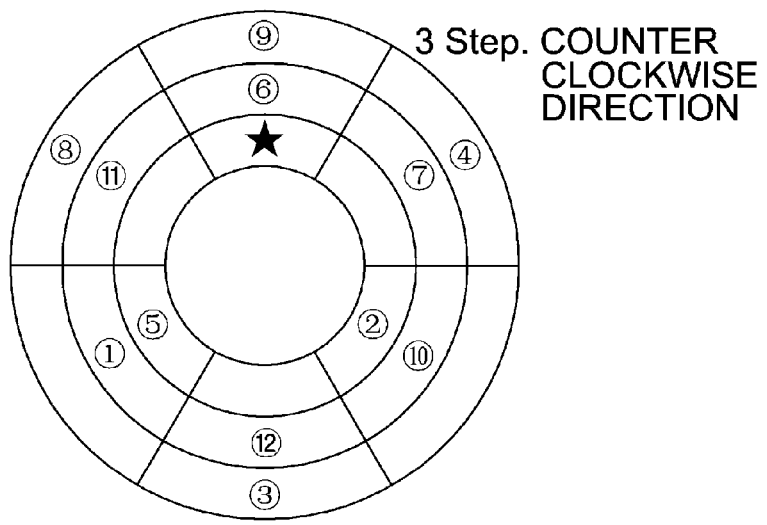
Figure 10J:
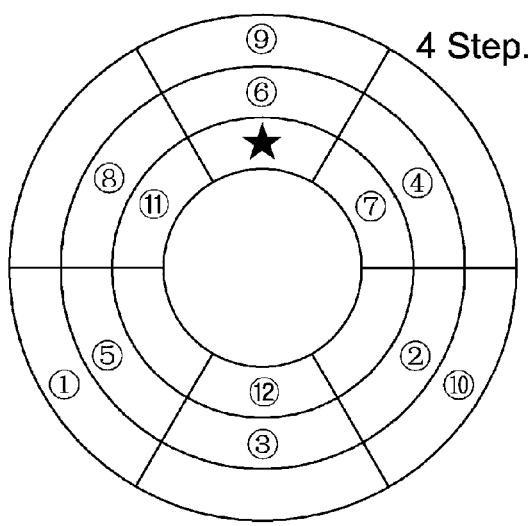

The three-dimensional braiding process as illustrated in FIGS. 9 to 10J is an example in which a rotating direction may be changed by adding an idle process depicted by a mark ☆. In other words, when the movement of the carrier is locked by changing a position of the idle process of the mark ☆ for every 4 steps, the whole braid fiber may be braided by moving the braid fiber which is not moved by the locking apparatus at an initial stage.

Therefore, the preform may be manufactured into a preform structure separated into a plurality of band shapes which may be integrally coupled with the braid structure having a cylinder shape by separating the locking apparatus or the locking accessory in the existing braiding process and mounting or modifying a gear apparatus which may be configured to rotate in a reverse direction.

Figure 11:
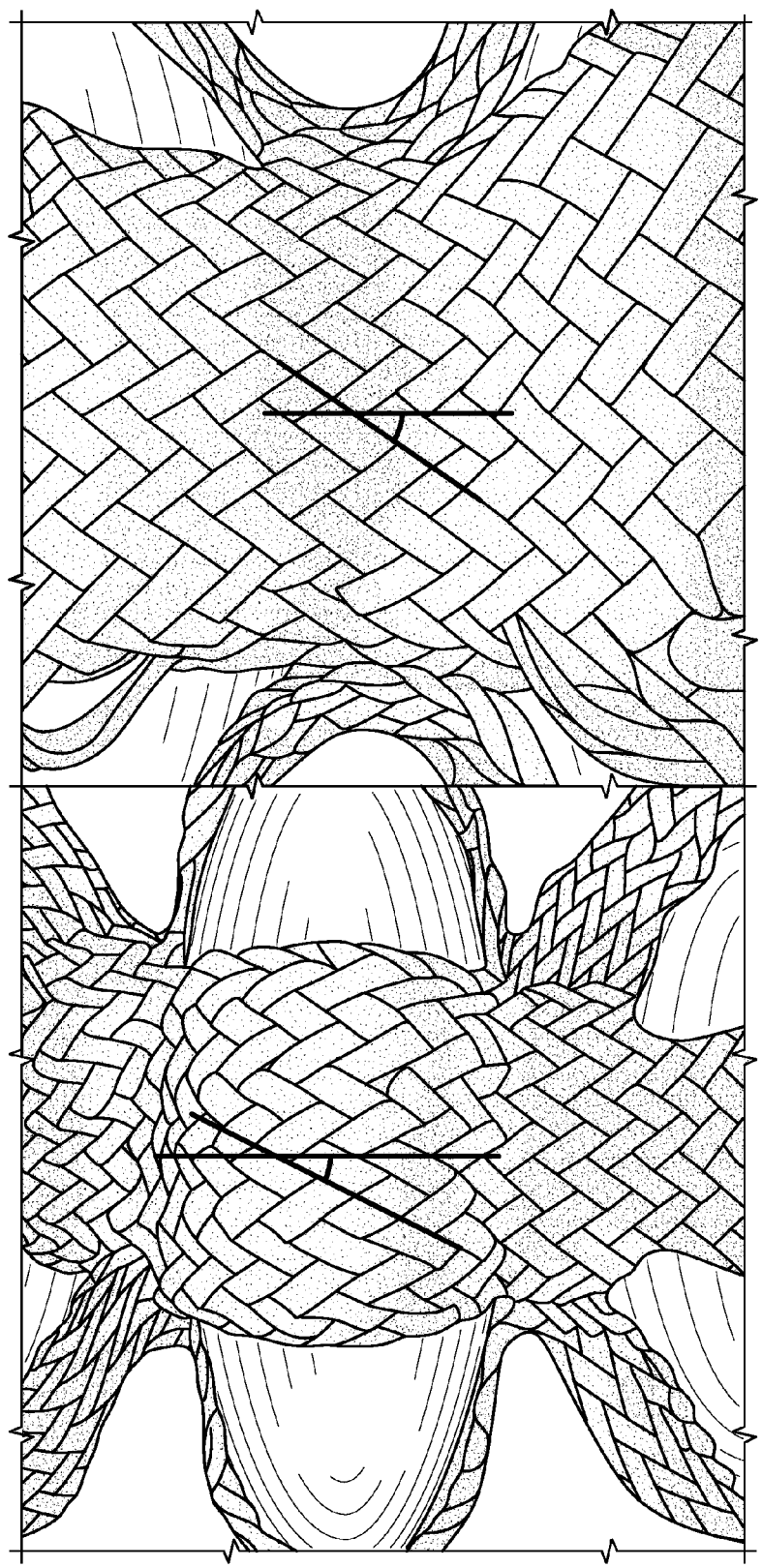
FIG. 11 is an exemplary image illustrating a change of a fiber orientation angle according to a change of a cross sectional area of a preform having a cylinder structure and a separation structure having a band shape, which is manufactured by a braiding process according to an exemplary embodiment of the present invention.
Figure 12:
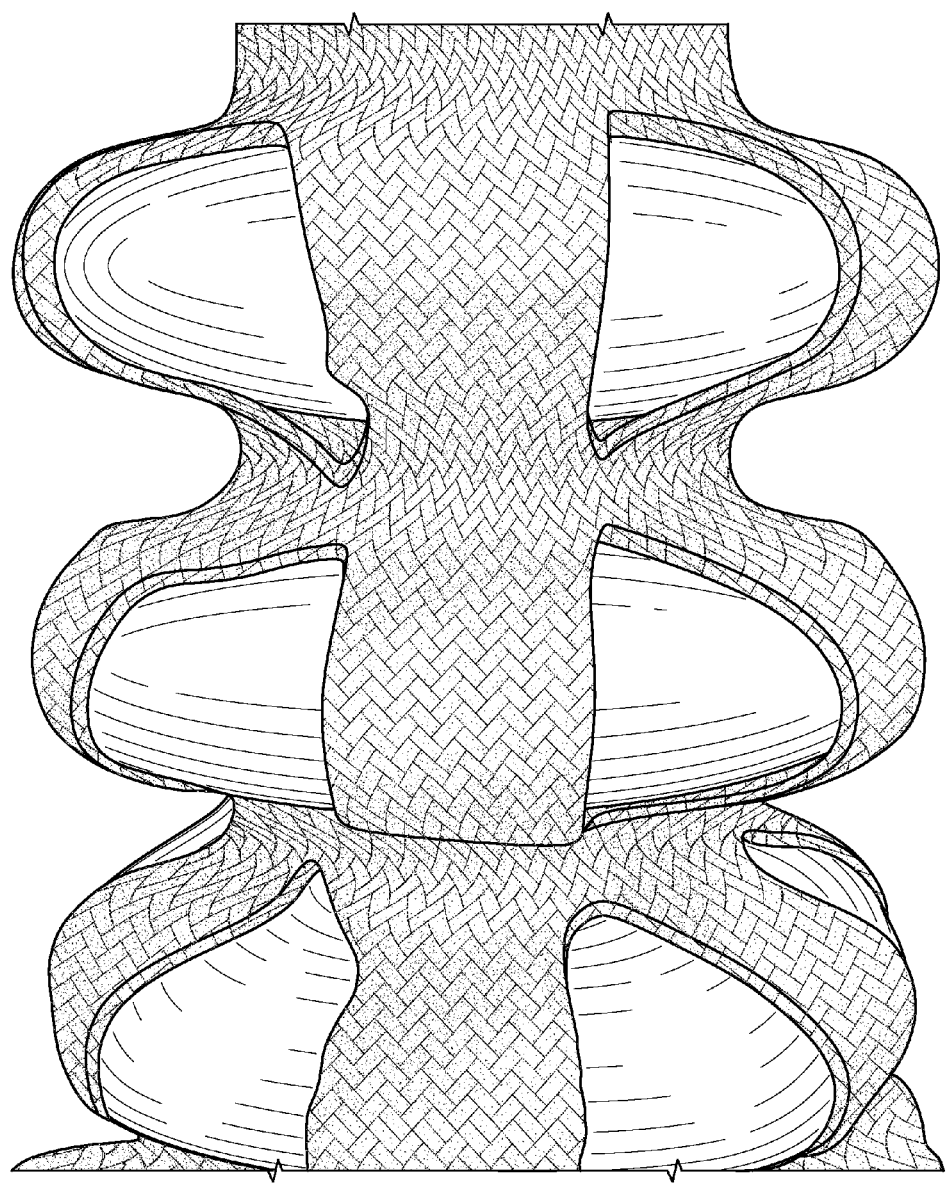
FIG. 12 is an exemplary image of a preform having a wrinkle shape which is manufactured by a braiding process according to an exemplary embodiment of the present invention.

When the braiding process is performed by the above method, the braid preform having the separated shape as illustrated in FIG. 6 may be manufactured. Therefore, as illustrated in FIGS. 11 and 12, the preform manufactured by the technology of the present invention may have substantially the same fiber volume fraction at any portion thereof despite a change of a cross sectional area, and the orientation angles of the braided fibers may be adjusted to allow the circular shape and the band shape to have substantially the same orientation angle.

The present invention as described above relates to a method of allowing the concave portion and the convex portion to have substantially the same fiber volume fraction and orientation angle when the corrugated preform is manufactured based on the braiding process, and more particularly, the concave portion and the convex portion may be manufactured to have the substantially same fiber volume fraction and orientation angle by braiding the concave portion by a method that is the same as the braiding method for the cylinder shape, and braiding the convex portion in a separated structure by installing, in braiding equipment, the locking apparatus or the apparatus which reversely rotates, thus eliminating the issue of the difference of the physical properties, which may be generated when the preform is manufactured by the general braiding process of the related art.

While the present invention has been described in terms of exemplary embodiments of the present invention, which are merely examples, it should be appreciated that the present invention is not limited to those embodiments. The described embodiments may be changed or altered by the person skilled in the art without departing from the scope of the present invention, and various changes and alterations may be made within the equivalent range of the technical spirit of the present invention and the claims accompanying below.

What is claimed is:

1. A method of manufacturing a corrugated preform using a braiding process, comprising:
   braiding a composite material corresponding to an outer diameter of a cylindrical cylinder shape;
   braiding the composite material by connecting a plurality of separate composite materials to one side of the braided composite material; and
   braiding the composite material to one side of the separate composite material corresponding to the outer diameter of the cylindrical cylinder shape,
   wherein the braiding the composite material corresponding to an outer diameter of a cylindrical cylinder shape and the braiding the composite material to one side of the separate composite material corresponding to the outer diameter of the cylindrical cylinder shape are applied to a process of manufacturing a concave portion of the corrugated preform,
   wherein the concave portion of the corrugated preform is braided in the process while rotating an equipment plate in a predetermined direction.

2. The method of claim 1, wherein the braiding the composite material by connecting a plurality of separate composite materials to one side of the braided composite material is applied to a process of manufacturing a convex portion of the corrugated preform.

3. The method of claim 2, wherein the convex portion of the corrugated preform is braided in a stationary state of the equipment plate.

4. The method of claim 2, wherein the convex portion of the corrugated preform is braided while rotating the equipment plate in a direction opposite to the rotating direction of the braiding the composite material in the concave portion.

5. The method of claim 1, wherein the composite material is a glass-fiber reinforced composite material or a carbon fiber-reinforced composite material.

* * * * *